United States Patent Office 3,298,847
Patented Jan. 17, 1967

3,298,847
METHOD OF MAKING QUINACRIDONE
SOLID SOLUTIONS
Albert Robert Hanke, Westfield, and William J. Marshall, Scotch Plains, N.J., assignors to E. I. du Pont de Nemours and Company, Wilmington, Del., a corporation of Delaware
No Drawing. Filed Aug. 12, 1963, Ser. No. 301,620
11 Claims. (Cl. 106—288)

This invention relates to an improved method for the preparation of solid solutions of quinacridone compounds.

The quinacridone series of compounds has been described in various literature references and in U.S. patents. The preparation of solid solutions of linear quinacridones is described in the copending application of F. F. Ehrich, Serial No. 24,483, filed April 25, 1960, now U.S. Patent 3,160,150. The methods described for formation of a solid solution include treatment of a mixture of suitable quinacridone compounds in one of the following ways:

(1) Contacting the quinacridone mixture with a polar organic liquid such as dimethylformamide and the like.
(2) Acid pasting the quinacridone mixture (i.e., dissolving it in acid and then regenerating the quinacridone by reducing the acid concentration), followed by contacting it with a polar organic liquid.
(3) Salt milling the quinacridone mixture and then contacting the salt-milled mixture with a polar organic liquid.
(4) Salt-milling the quinacridone mixture in the presence of a small amount of an organic liquid (dispersion milling) followed by exposure of the milled material to a polar organic liquid.

The present invention resides in the discovery that a remarkable improvement results in the process for forming a solid solution of quinacridone compounds by contacting a mixture of quinacridone compounds with a polar organic liquid when the contacting step is performed in the presence of a strong base such as sodium hydroxide, potassium hydroxide, or quaternary ammonium hydroxides.

The term "solid solution" which has been used to characterize the products formed by the new process of this invention is a well recognized term in the study of the properties of solid substances. It is defined in Webster's Dictionary as "a solid, homogeneous mixture of two or more constituents which may vary in composition between certain limits and remain homogeneous." This phenomenon is discussed at length in many physical chemistry texts such as in the "Textbook of Physical Chemistry," Samuel Glasstone, 2d edition, 1946, New York, p. 349 ff. In a solid solution, the molecules of the components enter into the same crystal lattice, usually, but not always, that of one of the components. The X-ray pattern of the resulting crystalline solid is characteristic of that solid and can be clearly differentiated from the pattern of a physical mixture of the same components in the same proportion. In such physical mixtures, the X-ray lines of each of the components can be distinguished, and the disappearance of many of these lines is one of the criteria of the formation of a solid solution. More particularly, the X-ray pattern of a solid solution is different from the sum of the X-ray patterns of the components.

There are two important properties of the products formed by the new process of this invention which render them particularly useful as pigments. In contrast to simple physical mixtures wherein the color is usually a direct function of the additive effects of the two or more components, these solid solutions give unexpected and unpredicatable tinctorial values. It is impossible to generalize about the direction or degree of color shift, and this is additional evidence of the unpredictability of the phenomenon.

The second valuable property is a remarkable enhancement of lightfastness which frequently accompanies the formation of solid solution. In physical mixtures of two pigments, on exposure to light, the components show their individual behaviors frequently resulting in marked changes of hue as one fades more than the other. In contrast, the solid solutions behave as single substances with respect to any change in hue and characteristically show superior lightfastness even in this field of quinacridones in which lightfastness is generally good.

Compounds which may be components of the solid solutions formed by the improved process of this invention include the linear quinacridones having the following structural formula:

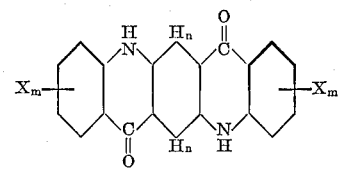

where X is F, Cl, Br, lower alkyl, lower alkoxy, or combinations of these groups, $n$ is an integer of from 1–2 and $m$ is an integer of from 0–2, both limits being included. The lower alkyl substituents in the above formula include methyl, ethyl, propyl, isopropyl, butyl, isobutyl, and tert. butyl. The lower alkoxy substituents may be methoxy, ethoxy, propoxy, isopropoxy, butoxy, isobutoxy and tert. butoxy. Linear quinacridones have been widely described in publications and patents, and in referring to these compounds the term "linear" is usually omitted. Therefore, the term "quinacridones" (QA), as used throughout the ensuing specification, refers to compounds possessing the linear quinacridone structure. Methods for producing linear quinacridones are disclosed in U.S. Patents 2,821,529 and 2,821,530.

Another group of compounds which may be components of the solid solutions formed by the improved process of this invention include the quinacridonequinones, which have the following structural formula:

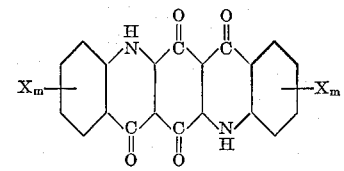

where the symbols X and $m$ have the same significance as set forth above in connection with linear quinacridone. Quinacridonequinone, also known as quin(2,3b)-acridine-6,7,13,14(5,12)-tetrone, appears to have been first described by Sharvin in J. Rus. Phys. Chem. Soc. 47, 1260 (1915); C.A., vol. 9, 3056 (1915). It is commonly prepared by condensing benzoquinone with anthranilic acid in the presence of an excess of benzoquinone to give quinone dianthranilic acid which is, in turn, cyclized by heating in concentrated sulfuric acid to give quinacridonequinone. Substituted quinacridonequinones can be prepared by using the appropriately substituted anthranilic acid. For example, 2-amino-5-chlorobenzoic acid can be used to produce a chlorinated derivative of quinacridonequinone.

A third group of related compounds which can be used as components of the solid solutions formed by the improved process of this invention are the isoquinacridones having the following structural formula:

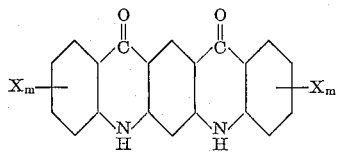

where X is F, Cl, Br, lower alkyl, lower alkoxy, or combinations of these groups, and m is an integer of from 0–2, both limits being included. Examples of the lower alkyl substituents in the above formula are methyl, ethyl, isopropyl, and n-butyl. Examples of the lower alkoxy substituents are methoxy, ethoxy, propoxy, isobutoxy and tert. butoxy. Isoquinacridone, also known as quin(3,2b)-acridine-12,14(5,7H)-dione, is described by Eckert and Seidel, J. prakt. Chem. 102, 338–40 (1921) who reacted a 4,6-dibromoisophthalic acid derivative with aniline to obtain 4,6-dianilinoisophthalic acid which was cyclized in a mixture of $PCl_5$ and $AlCl_3$ to the isoquinacridone. Substituted isoquinacridones can be made by the use of appropriately substituted aniline in this reaction.

In the new method of this invention, the strong bases facilitate formation of solid solution by increasing the solubility of the solid solution components in the polar organic liquid used in the process. Various strong bases such as alkali metal hydroxides, alkaline earth metal hydroxides and quaternary ammonium hydroxides can be used. Sodium hydroxide, potassium hydroxide, lithium hydroxide, barium hydroxide and benzyl-trimethyl-ammonium hydroxide are particularly useful. A preferred procedure is to heat the mixture of the polar organic liquid, the base and the quinacridone compounds to the boil and maintain it at the boil, with reflux, for several hours. However, satisfactory results can be obtained by stirring at lower temperatures for a prolonged period. As the tempeature of stirring decreases, the time required for solid solution formation increases.

The quantity of strong base used in the process of the invention may be varied widely. The minimum effective quantity is that required to give the slurry a distinctly alkaline reaction which is about 2% based on the weight of the pigment. It is preferred to use less than the quantity which results in complete solution of the quinacridone compounds, since formation of such a solution necessitates an additional step of decreasing the alkali concentration to regenerate the quinacridones as a solid solution.

The formation of quinacridone solid solutions is greatly facilitated by the process of this invention. The use of a strong base with a polar organic liquid in accordance with the invention gives more rapid and complete solid solution formation than the prior procedures involving use of the polar organic liquid in the absence of a strong base. For example, highly crystalline forms of quinacridone compounds are converted into solid solutions only on prolonged exposure to a highly polar organic liquid such as dimethylformamide so that a period of days or even weeks at the boil is required for preparation of a solid solution in such instances. The time required is reduced to a few hours if a strong base is added to the pigment slurry in accordance with this invention.

For a clearer understanding of the invention, the following specific examples are given. These examples are intended to be merely illustrative of the invention and not in limitation thereof. Unless otherwise specified, all parts are by weight.

*Example I*

Highly crystalline gamma phase quinacridone (3.1 parts), as described in U.S. Patent 2,844,581, and highly crystalline 4,11-dichloroquinacridone (1.9 parts) are added at room temperature to 80 parts of dimethylformamide mixed with 0.13 part of potassium hydroxide. The mixture is heated to the boil with vigorous stirring and is maintained at the boil under reflux for 6 hours. The product is isolated by filtration, washing and drying in conventional fashion.

A red powder is obtained, which on X-ray examination, exhibits the diffraction pattern characteristics of the quinacridone-dichloroquinacridone solid solution described in the above identified copending application, Serial No. 24,483, of F. F. Ehrich. When $CuK_a$ radiation is used, the X-ray diffraction pattern has strong peaks at diffraction angles ($2\theta°$) of approximately 6.4°, 12.8°, 13.2° and 26.6°. The diffraction pattern of the solid solution is substantially different from that of a simple physical mixture of quinacridone and 4,11-dichloroquinacridone in the indicated proportions. The strong X-ray diffraction peaks ($CuK_a$ radiation), of the simple physical mixture are at $2\theta$ values of 6.6° 12.6°, 13.1°, 13.9°, 25.3° and 26.4° which peaks correspond to strong diffracted peaks of the components in the mixture.

Highly crystalline quinacridone compounds are converted into solid solutions only with difficulty in the absence of alkali under the conditions of this example. Boiling the mixture of quinacridone and 4,11-dichloroquinacridone in dimethylformamide for 6 hours as described in the first part of this example, but without added alkali, yields a product containing a substantial proportion of "free" quinacridone not in solid solution.

Replacement of the potassium hydroxide in this example with a chemically equivalent quantity of sodium hydroxide or a quaternary ammonium hydroxide yields results like those obtained with use of potassium hydroxide.

*Example II*

Quinacridone (3.1 parts) and 4,11-dichloroquinacridone (1.9 parts) are stirred for 6 hours with a mixture of 40 parts of dimethylformamide (DMF) and 0.3 part of benzyl-trimethyl-ammonium hydroxide, at the boil, under reflux. The slurry is then filtered and the solid obtained is washed and dried in the conventional manner. The product obtained is a solid solution as described in Example I.

*Example III*

Quinacridone (3.1 parts) and 4,11-dichloroquinacridone (1.9 parts) are stirred at room temperature with a mixture of 40 parts of dimethylformamide (DMF) and 20 parts of benzyltrimethyl-ammonium hydroxide until a solution is obtained. The dissolved material is regenerated in the form of a solid solution by adding the liquid solution rapidly to 600 parts of a vigorously stirred mixture of ice and water. The product is isolated in conventional fashion by filtration, washing and drying. A scarlet colored solid solution is obtained with the properties described in Example I.

*Example IV*

Gamma quinacridone (3.0 parts) and 4,11-dichloroquinacridone (2.0 parts ) are stirred into 160 parts of methanol at room temperature. Sodium hydroxide (20 parts of 50% aqueous solution) is added and the mixture is heated to the boil and boiled, with reflux, for 72 hours. The red solid is isolated from the slurry by filtration, washing and drying. The product is a solid solution of quinacridone and 4,11-dichloroquinacridone with the X-ray diffraction pattern described in Example I.

A repetition of the process, as described in the preceding paragraph except for omission of the sodium hydroxide, does not result in a solid solution. Under those conditions, the product, like the starting material, consists of a mixture of gamma quinacridone and 4,11-dichloroquinacridone.

*Example V*

Example IV was repeated but with replacement of methanol by an equal weight of 2B alcohol (ethanol denatured with a small quantity of benzene). The product obtained is substantially the same as that of Example IV.

*Example VI*

It is not necessary to isolate the quinacridone compounds in dry powder form to prepare the solid solution by the process of this invention. For example, a solid solution may be formed satisfactorily by addition of a suitable second component and a strong base to an alcoholic slurry containing quinacridone formed by oxidation of a dihydroquinacridone as illustrated in the present example.

Quinacridone is formed in methanolic slurry by oxidation of dihydroquinacridone as follows: 12 parts of 6,13-dihydroquinacridone is added to 160 parts of methanol, then 8 parts of sodium hydroxide dissolved in 32 parts of water is added, followed by 60 parts of water. Nitrobenzene-m-sodium sulfonate (9.0 parts) is added to the mixture which is then heated with stirring to the boil and boiled for five hours under reflux to oxidize the dihydroquinacridone. To the resulting quinacridone slurry formed by oxidation, 8 parts of 4,11-dichloroquinacridone and a solution of 12 parts of sodium hydroxide in 28 parts of water are added. The temperature of the slurry is adjusted to 55° C., the mixture is stirred for two hours at that temperature and then is heated to the boil and boiled for 8 hours under reflux. The product obtained is a solid solution of quinacridone and 4,11-dichloroquinacridone as described in Example I.

*Example VII*

1.9 parts of 2,9-dichloroquinacridone and 3.1 parts of quinacridone are added with stirring to a mixture of 80 parts of dimethylformamide and 0.2 part of potassium hydroxide. The mixture is heated to the boil and boiled gently for six hours under reflux after which the product is isolated by filtration, washing and drying. The product is a red powder with an X-ray diffraction pattern substantially different from that of the sum of the patterns of the components. It exhibits three strong peaks at diffraction angles (2θ) of 5.9°, 13.8° and 27.6°.

*Example VIII*

3.0 parts of 6,13-dihydroquinacridone and 2.0 parts of 4,11-dichloro-6,13-dihydroquinacridone are added with stirring to approximately 200 parts of methanol mixed with 10 parts of 50% aqueous sodium hydroxide. The mixture is heated to the boil and boiled for two hours under reflux after which it is added slowly with vigorous stirring to approximately 10 volumes of water. The precipitate is isolated in the usual manner by filtration, washing and drying. The product obtained has an X-ray diffraction pattern substantially different from that obtained with a simple mechanical mixture of the components in the indicated proportions.

Oxidation of the solid solution of the dihydroquinacridones to the corresponding quinacridones yields a solid solution of quinacridone compounds. For example, the dihydroquinacridone solid solution prepared as described in the foregoing part of this example is oxidized as follows: The dihydroquinacridone solid solution is added to 70 parts of methanol, and 3.5 parts of sodium hydroxide dissolved in 15 parts of water is added, followed by 25 parts of water. Nitrobenzene-m-sodium sulfonate (3.8 parts) is added to the mixture which is then heated with stirring to the boil and boiled for 5 hours under reflux to oxidize the dihydroquinacridone. The oxidized product, isolated in conventional fashion from the slurry, is a solid solution of quinacridone and 4,11-dichloroquinacridone with substantially the same properties as the product of Example I.

*Example IX*

The following combinations are each pre-conditioned by dissolving them in concentrated sulfuric acid and then precipitating them by rapid addition of water. The thus prepared mixtures are isolated by filtration, washing and drying and are thereafter treated in the manner set forth in Example I (contacting with a mixture of dimethylformamide and an alkali) to yield in each case a solid solution with an X-ray diffraction pattern substantially different from that of the corresponding physical mixture.

|   | Quinacridone | 4,11-difluoro-quinacridone | 4,11-dimethyl-quinacridone | 4,11-dimethoxy-quinacridone | 4,11-dichloro-quinacridone |
|---|---|---|---|---|---|
| A | 66 | 34 |   |   |   |
| B | 80 |   | 20 |   |   |
| C | 15 |   | 85 |   |   |
| D |   | 65 |   |   | 35 |
| E |   | 15 | 85 |   |   |
| F | 60 | 20 |   |   | 20 |
| G |   | 20 | 70 |   | 10 |
| H | 10 |   |   | 90 |   |

|   | Quinacridone | 2,9-dichloro-quinacridone | 2,9-difluoro-quinacridone | 2,9-dimethyl quinacridone |
|---|---|---|---|---|
| I | 25 | 75 |   |   |
| J | 15 | 60 |   | 25 |
| K |   | 45 |   | 55 |
| L |   | 15 | 55 | 30 |
| M |   | 50 | 25 | 25 |
| N |   | 50 | 50 |   |
| O | 15 | 60 | 25 |   |
| P | 10 | 45 | 25 | 20 |

*Example X*

Quinacridonequinone (3.0 parts) and linear quinacridone (1.0 parts) are added to 65 parts of dimethylformamide mixed with 0.15 parts of sodium hydroxide. The mixture is heated to the boil with stirring and boiled for 6 hours under reflux. The product is then isolated by filtration, washing and drying in conventional fashion. The reddish yellow product exhibits substantially the X-ray diffraction pattern of pure quinacridonequinone with a slight shift towards larger diffraction angles. There are no lines corresponding to the linear quinacridone in the composition.

The solvents used in the examples were dimethylformamide, methanol and 2B alcohol; and dimethylformamide is preferred because of its ready availability and solvency power. A chemically related solvent, also commercially available, is dimethylacetamide which is equally effective. Other effective solvents are tetramethylene sulfone, dimethyl sulfoxide, ethylene glycol, diethylene glycol, glycerine, aniline, pyridine, quinoline, N,N-dimethylaniline, ethanol amine and ethylene diamine. Generically, these can be classified as strongly polar amides, sulfones, sulfoxides, primary alcohols having up to three carbon atoms, polyhydric alcohols containing up to four carbon atoms and amines.

Similarly, the strong bases used in the examples were sodium hydroxide, potassium hydroxide and benzyl-trimethyl-ammonium hydroxide. These were used due to their ready availability. However, any strong base can be used and is considered to be within the generic contemplation of the invention.

Also, each of the following mixtures may be treated in the manner described in Example X to give solid solutions with characteristic X-ray diffraction patterns:

1.6 parts of linear quinacridone
2.4 parts of 4,11-difluoroquinacridonequinone 2.0 parts of linear quinacridone
2.0 parts of 2,9-dichloroquinacridonequinone 2.0 parts quinacridonequinone
2.0 parts 4,11-dimethylquinacridonequinone 2.0 parts 4,11-dichloroquinacridonequinone
2.0 parts 4,11-dimethylquinacridonequinone 2.4 parts 2,9-dichloroquinacridone
1.6 parts 2,9-dichloroquinacridonequinone 1.3 parts isoquinacridone
2.7 parts linear quinacridone 3.4 parts 2,10-dichloroisoquinacridone
0.6 part 2,9-dichloroquinacridone 2.0 parts isoquinacridone
2.0 parts 2,10-dichloroisoquinacridone Solid solution can also be obtained from quinacridone and 2,9-dimethoxyquinacridone or quinacridone and 2,9-dimethylquinacridone by contacting said quinacridones with a polar organic liquid, selected from the class defined above, in the presence of a strong base.

The solid solution products formed by the process of this invention offer certain outstanding advantages in the field of colored pigments. These solid solutions widen the range of hues available in lightfast quinacridone pigments, both towards the orange or yellow side of the spectrum and towards the blue side. Moreover, it is possible to produce solid solution pigments having outstanding lightfastness from materials which by themselves have insufficient light stability to meet the demands of the present-day pigments market.

Since it is obvious that many changes and modifications can be made in the above-described details without departing from the nature and spirit of the invention, it is to be understood that the invention is not limited to said details except as set forth in the appended claims.

The invention claimed is:
1. In the preparation of a solid solution of at least two linear quinacridone compounds having formulae selected from the group consisting of:

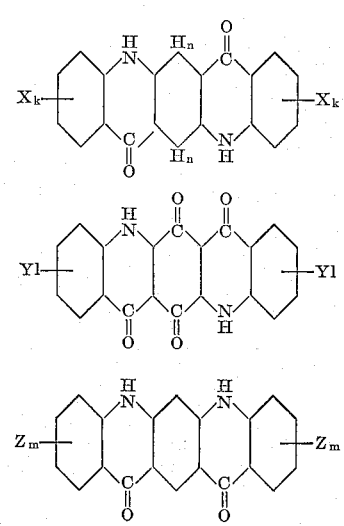

where X, Y and Z are radicals selected from the group consisting of fluorine, chlorine, bromine, alkyl, groups of 1–4 carbon atoms and alkoxy groups of 1–4 carbon atoms and where $k$, $l$ and $m$ are integers of from 0–2, inclusive, and $n$ is an integer of from 1–2, inclusive, by contacting said quinacridone compounds with a polar organic liquid selected from the group consisting of strongly polar amides, sulfones, sulfoxides, primary alcohols having up to three carbon atoms, polyhydric alcohols containing up to four carbon atoms and amines to form a quinacridone-liquid mixture, the improvement which comprises performing said contacting step in the presence of a strong base in an amount of at least 2% based on the weight of said linear quinacridone compounds.

2. The process of claim 1 wherein the strong base is a member selected from the group consisting of sodium hydroxide, potassium hydroxide and quaternary ammonium hydroxides.

3. The process of claim 1 wherein the strong base is a quarternary ammonium hydroxide.

4. The process of claim 1 wherein the strong base is benzyl-trimethyl-ammonium hydroxide.

5. The process of claim 1 wherein the strong base is sodium hydroxide.

6. The process of claim 1 wherein the strong base is potassium hydroxide.

7. In the preparation of a solid solution of linear quinacridone and 4,11-dichloroquinacridone by contacting said quinacridone compounds with a polar organic liquid selected from the group consisting of strongly polar amides, sulfones, sulfoxides, primary alcohols having up to three carbon atoms, polyhydric alcohols containing up to four carbon atoms and amines to form a quinacridone-liquid mixture, the improvement which comprises performing said contacting step in the presence of a strong base in an amount of at least 2% based on the weight of the quinacridone compounds.

8. In the preparation of a solid solution of quinacridone and 2,9-dichloroquinacridone by contacting said quinacridone compounds with a polar organic liquid selected from the group consisting of strongly polar amides, sulfones, sulfoxides, primary alcohols having up to three carbon atoms, polyhydric alcohols containing up to four carbon atoms and amines to form a quinacridone-liquid mixture, the improvement which comprises performing said contacting step in the presence of a strong base in an amount of at least 2% based on the weight of the quinacridone compounds.

9. In the preparation of a solid solution of quinacridone and quinacridonequinone by contacting said compounds with a polar organic liquid selected from the group consisting of strongly polar amides, sulfones, sulfoxides, primary alcohols having up to three carbon atoms, polyhydric alcohols containing up to four carbon atoms and amines to form a quinacridone-liquid mixture, the improvement which comprises performing said contacting step in the presence of a strong base in an amount of at least 2% based on the weight of the quinacridone compounds.

10. In the preparation of a solid solution of quinacridone and 2,9-dimethoxyquinacridone by contacting said quinacridone compounds with a polar organic liquid selected from the group consisting of strongly polar amides, sulfones, sulfoxides, primary alcohols having up to three carbon atoms, polyhydric alcohols containing up to four carbon atoms and amines to form a quinacridone-liquid mixture, the improvement which comprises performing said contacting step in the presence of a strong base in an amount of at least 2% based on the weight of the quinacridone compounds.

11. In the preparation of a solid solution of quinacridone and 2,9-dimethylquinacridone by contacting said quinacridone compounds with a polar organic liquid selected from the group consisting of strongly polar amides, sulfones, sulfoxides, primary alcohols having up to three carbon atoms, polyhydric alcohols containing up to four carbon atoms and amines to form a quinacridone-liquid mixture, the improvement which comprises performing said contacting step in the presence of a strong base in an amount of at least 2% based on the weight of the quinacridone compounds.

References Cited by the Examiner

UNITED STATES PATENTS

| | | | |
|---|---|---|---|
| 2,969,366 | 1/1961 | Griswold et al. | 260—279 |
| 3,007,930 | 11/1961 | Manger et al. | 106—288 |
| 3,148,075 | 9/1964 | Ehrich | 106—288 |
| 3,160,510 | 12/1964 | Ehrich | 106—288 |

TOBIAS E. LEVOW, *Primary Examiner.*

S. E. MOTT, *Assistant Examiner.*